No. 855,829. PATENTED JUNE 4, 1907.
J. ALBRECHT.
DRILL AND LIKE CLAMPING CHUCK.
APPLICATION FILED MAR. 19, 1906.
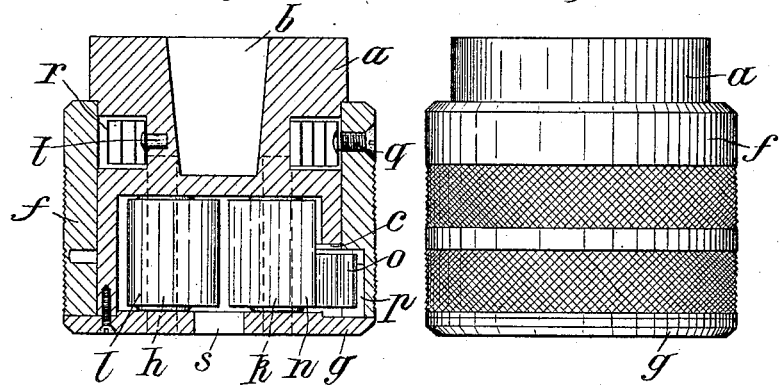

UNITED STATES PATENT OFFICE.

JOSEPH ALBRECHT, OF ESSLINGEN, GERMANY.

DRILL AND LIKE CLAMPING CHUCK.

No. 855,829.  Specification of Letters Patent.  Patented June 4, 1907.

Application filed March 19, 1906. Serial No. 306,876.

*To all whom it may concern:*

Be it known that I, JOSEPH ALBRECHT, a citizen of the German Empire, residing at Esslingen-on-the-Neckar, Kesselwasen 6, in the Kingdom of Würtemberg, Germany, have invented certain new and useful Improvements in Drill and Like Clamping Chucks; and I do hereby declare the following to be a full, clear, and exact description of the invention, such as will enable others skilled in the art to which it appertains to make and use the same.

This invention relates to chucks for holding drills and other tools and has for its principal object to provide an improved form of chuck in which the shank will be automatically centered and tightened.

A further object of the invention is to provide a chuck from which any tool may be removed and another substituted therefor without stopping the rotating movement of the chuck.

My invention consists in the matters hereinafter described and referred to in the appended claims.

Figure 1 is a sectional plan view of a chuck constructed in accordance with the invention. Fig. 2 is a plan view of the same. Fig. 3 is a transverse sectional view of the chuck in the plane of the spring. Fig. 4 is a similar view in the plane of the clamping dogs.

In the drawings:—the body portion $a$ of the chuck is approximately cylindrical in form and is provided with a tapering opening $b$ for the reception of the head stock or drill spindle. The front of the body is counterbored to form a cylindrical recess for the reception of the clamping dogs and in the wall of the recess are arranged openings $c, d, e$. On the outer face of the chuck body is mounted a knurled ring $f$, held from movement in one direction by an annular shoulder on the chuck body and in the opposite direction by a cap plate $g$ which has a central opening $s$ for the passage of the shank of the drill or other tool.

Extending between the body portion $a$ and the cap $g$ are three pins $h, i, k$, on which are mounted tool centering and clamping dogs $l, m$, and $n$ having clamping faces disposed eccentrically to the pivot pins so that they may engage tool shanks of different diameter and may automatically tighten the grip on the tool shank when the chuck is rotated. From each dog extends an arm $o$ passing through the one of the recesses $c, d, e$ and engaging in a recess $p$ in the inner wall of the ring $f$. At a point above the dog receiving recess the chuck body is provided with an annular groove for the reception of a spiral spring $r$ one end of which is secured to the ring $f$ by means of a screw $q$ while the opposite end is secured to the inner wall of the groove by a pin $t$. The spring tends to throw the ring $f$ around in such manner as to turn all of the tool gripping dogs to operative position.

To insert or remove a tool while the chuck is rotating it is merely necessary to grasp and hold the ring $f$. This results in the turning of the dogs to release position as the chuck continues to rotate. A tool may then be inserted and on releasing the ring $f$, is immediately centered and gripped by the dogs.

I claim:—

1. A drill chuck having a recessed body portion, pivoted gripping jaws arranged in the recesses and having arms projecting through openings in the wall of said recess, a ring mounted on the body and having recesses in which the arms engage, said body portion having an annular groove, and a spiral spring arranged in the groove and having one end secured to the body and the other end to the ring; substantially as described.

2. A drill chuck body having a recess at one end, and an annular groove in its periphery, a cap closing the mouth of the recess, a series of pins extending across the recess and secured at one end to the body and the other end to the cap, gripping jaws mounted on the pins and having projecting arms, a knurled ring mounted on the body and held in place by the cap, said ring having recesses to receive said arms, and a spiral spring arranged in the groove and secured at one end to the chuck body and at the opposite end to the ring; substantially as described.

In testimony whereof I hereunto affix my signature in the presence of two witnesses.

JOSEPH ALBRECHT.

Witnesses:
 AUGUST DRANTZ,
 OTTO SEIFERT.